(12) United States Patent
Muesch et al.

(10) Patent No.: US 10,439,951 B2
(45) Date of Patent: Oct. 8, 2019

(54) JITTER BUFFER APPARATUS AND METHOD

(71) Applicant: Dolby Laboratories Licensing Corporation, San Francisco, CA (US)

(72) Inventors: Hannes Muesch, Oakland, CA (US); Richard J. Cartwright, Killara (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 198 days.

(21) Appl. No.: 15/460,490

(22) Filed: Mar. 16, 2017

(65) Prior Publication Data
US 2017/0272375 A1 Sep. 21, 2017

Related U.S. Application Data

(60) Provisional application No. 62/394,820, filed on Sep. 15, 2016, provisional application No. 62/309,552, filed on Mar. 17, 2016.

(30) Foreign Application Priority Data

Sep. 15, 2016 (EP) .................................. 16189020.7

(51) Int. Cl.
*H04L 12/875* (2013.01)
*H04L 12/26* (2006.01)
(Continued)

(52) U.S. Cl.
CPC ............ *H04L 47/56* (2013.01); *H04L 43/087* (2013.01); *H04L 47/283* (2013.01); *H04L 47/50* (2013.01); *H04L 65/604* (2013.01); *H04L 65/80* (2013.01)

(58) Field of Classification Search
CPC ..... H04L 12/66; H04L 37/10; H04L 47/2433; H04L 47/24558; H04L 47/283;
(Continued)

(56) References Cited

U.S. PATENT DOCUMENTS 6,366,959 B1 4/2002 Sidhu
6,700,895 B1 3/2004 Kroll
(Continued)

FOREIGN PATENT DOCUMENTS

WO 2006/046904 5/2006
WO 2011/073217 6/2011
WO 2015/160617 10/2015

OTHER PUBLICATIONS

ITU-T P.800.1 "Methods for Subjective Determination of Transmission Quality" Series P: Telephone Transmission Duality, Methods for Objective and Subjective Assessment of Quality, Aug. 1996, pp. 1-37.

(Continued)

*Primary Examiner* — Hardikkumar D Patel

(57) ABSTRACT

Disclosed is a method and apparatus operative to process packets of media received from a network including a receiver unit operative, a jitter buffer data structure and a playback head defining a point in the jitter buffer data structure from which the ordered queue of packets are to be played back, and at least one prototype head. Each prototype head having a predetermined latency assigned thereto and defining a point in the jitter buffer data structure from which the ordered queue of packets is being played back containing said latency a processor operable to determine a measure of conversational quality associated with the ordered queue of packets being played back by each prototype head. Also described is a head selector operable to compare the measures of conversational quality associated with the ordered queue of packets being played back by each prototype head to select the prototype head with the highest measure of conversational quality and a playback unit coupled to the playback head.

13 Claims, 7 Drawing Sheets

(51) Int. Cl.
*H04L 12/841* (2013.01)
*H04L 12/863* (2013.01)
*H04L 29/06* (2006.01)

(58) Field of Classification Search
CPC ....... H04L 47/56; H04L 47/50; H04L 65/604;
H04L 65/80; H04L 49/90; H04L 65/4061;
H04L 69/40; H04L 65/1083; H04L 12/56;
H04L 1/0007; H04L 1/0018; H04L
29/06027; H04L 47/10; H04L 47/11;
H04L 47/2416; H04L 47/29; H04L
65/602; H04L 47/34; H04L 25/20; H04L
12/6418; H04L 29/06; H04L 47/30; H04L
65/1053; H04N 7/173; H04J 3/06; H04J
3/0632; G10L 19/167; G10L 21/04;
H04W 28/04; H04W 4/10; H04W 28/08;
H04B 7/04; H04B 7/06; H04B 7/0671
See application file for complete search history.

(56) References Cited

U.S. PATENT DOCUMENTS

| | | | |
|---|---|---|---|
| 7,359,324 | B1 | 4/2008 | Ouellette |
| 7,379,466 | B2 | 5/2008 | Kavaler |
| 7,701,980 | B1 | 4/2010 | Bugenhagen |
| 7,835,280 | B2 | 11/2010 | Pang |
| 8,848,525 | B2 | 9/2014 | Li |
| 2003/0152093 | A1* | 8/2003 | Gupta .................. H04J 3/0632 370/412 |
| 2004/0001493 | A1* | 1/2004 | Cloonan ................. H04L 47/10 370/395.42 |
| 2004/0062260 | A1 | 4/2004 | Raetz |
| 2004/0073692 | A1* | 4/2004 | Gentle .................... H04L 47/10 709/231 |
| 2004/0120309 | A1 | 6/2004 | Kurittu |
| 2005/0232309 | A1 | 10/2005 | Kavaler |
| 2006/0187970 | A1 | 8/2006 | Lee |
| 2008/0159384 | A1 | 7/2008 | Civanlar |
| 2008/0267224 | A1 | 10/2008 | Kapoor |
| 2011/0103377 | A1* | 5/2011 | Hua ....................... H04L 65/80 370/352 |
| 2011/0274053 | A1 | 11/2011 | Baik |
| 2013/0188482 | A1 | 7/2013 | Lee |
| 2014/0072000 | A1 | 3/2014 | Shiva |
| 2014/0269372 | A1 | 9/2014 | Roy |
| 2015/0029938 | A1* | 1/2015 | Eller ................... H04L 65/4061 370/328 |
| 2015/0092585 | A1 | 4/2015 | Shao |
| 2016/0043957 | A1 | 2/2016 | Mendez et al. |

OTHER PUBLICATIONS

ITU-T G.107 "The E-Model: A Computational Model for Use in Transmission Planning" International Telephone Connections and circuits—Transmission Planning and the E-Model, Jun. 2015, pp. 1-30.

Park, J. et al "Designing and Predicting QoS of a Wireless System for Medical Telemetry" 8th IEEE International Workshop on Performance and Management of Wireless and Mobile Networks, Oct. 22-25, 2012, pp. 737-744.

Ito, Y. et al "Psychometric Analysis of the Effect of Buffering Control on User-Level QoS in an Interactive Audio-Visual Application" 2004, ACM, NRBC Proceedings of the 2004 ACM Workshop on Next-Generation Residential broadband challenges, pp. 2-10.

Kovac, A. et al "E-Model MOS Estimate Improvement Through Jitter Buffer Packet Loss Modelling" 2011, proquest, Advances in Electrical and Electronic Engineerings, pp. 233-242, vol. 9, No. 5.

ITU-T Standard, "Definition of Categories of Speech Transmission Quality" G.109, Jan. 25, 2007, pp. 1-18.

Liang, G. et al "Effect of Delay and Buffering on Jitter-Free Streaming Over Random VBR Channels" Oct. 3, 2008, vol. .10, Issue 6., pp. 1-29.

* cited by examiner

JITTER BUFFER APPARATUS AND METHOD

CROSS-REFERENCE TO RELATED APPLICATIONS

The present application claims priority to U.S. Provisional Patent Application No. 62/394,820, filed Sep. 15, 2016, European Patent Application No. 16189020.7, filed Sep. 15, 2016, and U.S. Provisional Patent Application No. 62/309,552, filed Mar. 17, 2016, all of which are incorporated herein by reference in their entireties.

TECHNOLOGY

The present technology relates to an apparatus and method for receiving media signals such as voice and/or video over packet switched networks.

BACKGROUND

A so-called jitter buffer is a key component in any system that attempts to receive media, for example, audio and/or video being streamed over a packet-switched network for real time playback. Examples of such systems include a Voice over Internet Protocol (VoIP) system commonly used for real time media exchanges, such as voice or audiovisual conversations and conferences, for example, VoIP telephony or VoIP conferencing. Other systems include Voice over Long term Evolution (VoLTE) and Voice over Wi-Fi (Vo-WiFi) by way of, for example, an IP Multimedia Subsystem (IMS) network. In relation to a VoIP system, the receiver in such a system attempts to receive voice over a packet network such as the Internet in real time with low latency and high intelligibility. In such a system, packets may arrive out-of-order, packets may be lost, and there may be a variable delay of each packet causing jitter in the signal received caused by the network. The purpose of the jitter buffer is to compensate for the jitter introduced by the network in real time and to enable re-ordering of packets, without introducing too much latency, and without gaps or stutterings.

Consider voice communication as an example. Voice conversations typically occur in spurts, we call talk spurts, between which there is typically silence or only noise. The speech originating end records an input audio soundwave using at least one microphone, digitizes via an analog-to-digital converter (ADC) and codes the input audio signal to compress the data. It is common to divide the input signal into frames of digitized voice segments, for example, frames of 20 ms, and to packetize the frames into packets that each contain one or more frames, and additional information, including a packet sequence number in some systems and/or a frame timestamp such that a receiver can properly re-order the frames should they arrive out-of-order. Other information also may be included in or with a packet.

A common approach for exploiting the fact that there may be low voice activity in conversational speech is to classify the input signal as being of speech or of silence (silence including only background noise), for example, by using a Voice or Signal Activity Detector (VAD) to determine whether a frame is voice or silence. The frames determined to be silence can then be transmitted at reduced data rates. It will be appreciated that there may be other applications where speech detection is not as important within the audio signal. In such applications a VAD may be replaced by a Signal Activity detector (SAD)

The coding of the audio frames may use continuous transmission (CTX) according to which data frames are continuously transmitted, even during periods of speech inactivity, or may use discontinuous transmission (DTX), according to which transmission is discontinued in time intervals of speech inactivity to reduce the overall transmission power. The International Telecommunications Union (ITU) has published several standards for coding and transmission, including the G.722 standard according to which in CTX mode, when speech is absent, a lower rate coding mode is used to continuously encode the background noise. In DTX systems, the transmitter may be switched off during periods of speech non-activity. At the receiver side, to fill the gaps between talk spurts, a synthetic noise known as "comfort noise" may be generated, for example, using transmitted noise information.

In a packetized system, the media frames are packetized for sending between endpoints such that a sequence of packets is sent at a transmit endpoint. In a DTX system, two consecutive packets may have a period of silence between each other, or may be within the same talk spurt. As media packets traverse the network to an intended receiving endpoint, they experience a delay that depends, for example, on the respective route each may take, such that at a receiving endpoint, the packets arrive with different delays, possibly out-of-order, and with some packets lost or delayed by an amount that exceeds an acceptable level.

Consider a receiving endpoint, for example, a VoIP telephone or a VoIP bridge that includes a jitter buffer that uses jitter buffering. The packets arrive in a sequence which may or may not correspond to the sequence they were transmitted, and with different delays, causing what is known as jitter. The conventional approach to jitter buffering involves keeping a queue of packets to be played and picking the next packet for playback from an extraction point—the end of the queue upon each fetch for playback. At the start of each talk spurt, an insertion point into the playback queue is chosen such that the insertion point is some target latency that is forward of the current fetch point of the buffer (the head of the buffer). That is, silence compression or silence expansion is used to approach the target latency. This involves adding empty entries into the packet queue when the first packet of a talk spurt is received.

The target latency may be conventionally pre-determined by maintaining statistics, for example, a histogram of observations of network jitter and pre-setting the target latency to some high percentile of the jitter. For example, the target latency of the jitter buffer may be conventionally configured to track the 95'th percentile of network jitter. In the case of only counting conceals, this means that 5% of packets will arrive too late to be played out and the playback mechanism will include some signal processing to conceal the resulting gap in the media stream. Thus, conventionally, it is upon entry into the jitter buffer that a decision is required as to how to carry out silence compression or expansion to approach the pre-set target latency.

SUMMARY

In a first example embodiment an apparatus is described which is operative to process packets of media received from a network, including a receiver unit operative to receive the packets from the network, a jitter buffer data structure for arranging the received packets in an ordered queue, the jitter buffer data structure having a tail into which the packets are input and a playback head defining a point in the jitter buffer data structure from which the ordered queue of packets are to be played back, and at least one prototype head, each prototype head having a predetermined latency assigned thereto and defining a point in the jitter buffer data structure from which the ordered queue of packets is being played back containing the latency, a processor operable to determine a measure of conversational quality associated with the ordered queue of packets being played back by each prototype head, wherein the measure of conversational quality is determined at least in part by a measure of predicted listening quality and said predetermined latency and a head selector operable to compare said measures of conversational quality associated with the ordered queue of packets being played back by each prototype head to select the prototype head with the highest measure of conversational quality so as to adjust the playback head to match the prototype head associated with the highest measure of conversational quality and a playback unit coupled to the playback head.

In a second embodiment, a jitter buffering method is described comprises a jitter buffer data structure and processing hardware which includes the steps of receiving packets of media from a network, inputting each received packet into the jitter buffer data structure via a tail, the jitter buffer data structure comprises at least one head defining a point in the buffer from which packets are played back, the at least one head comprises an adjustable actual playback head coupled to an actual playback unit, and at least one prototype head having associated therewith a predetermined latency, determining a measure of conversational quality associated with each prototype head, comparing the measures of conversational quality for each prototype head to identify a prototype head that provides the highest measure of conversational quality, setting the actual playback head of the jitter buffer data structure to match the prototype head identified as providing the highest measure of conversational quality and playing back the media via a playback unit.

In yet another example embodiment, a non-transitory computer-readable medium with instructions stored thereon is disclosed such that when executed by one or more processors the non-transitory computer-readable medium preforms the jitter buffer method described above.

These and other embodiments and aspects are detailed below with particularity.

DESCRIPTION OF THE DRAWINGS

Example embodiments are illustrated by way of example, and not by way of limitation, in the figures of the accompanying drawings and in which like reference numerals refer to similar elements.

DETAILED DESCRIPTION

Overview

Figure 1A:
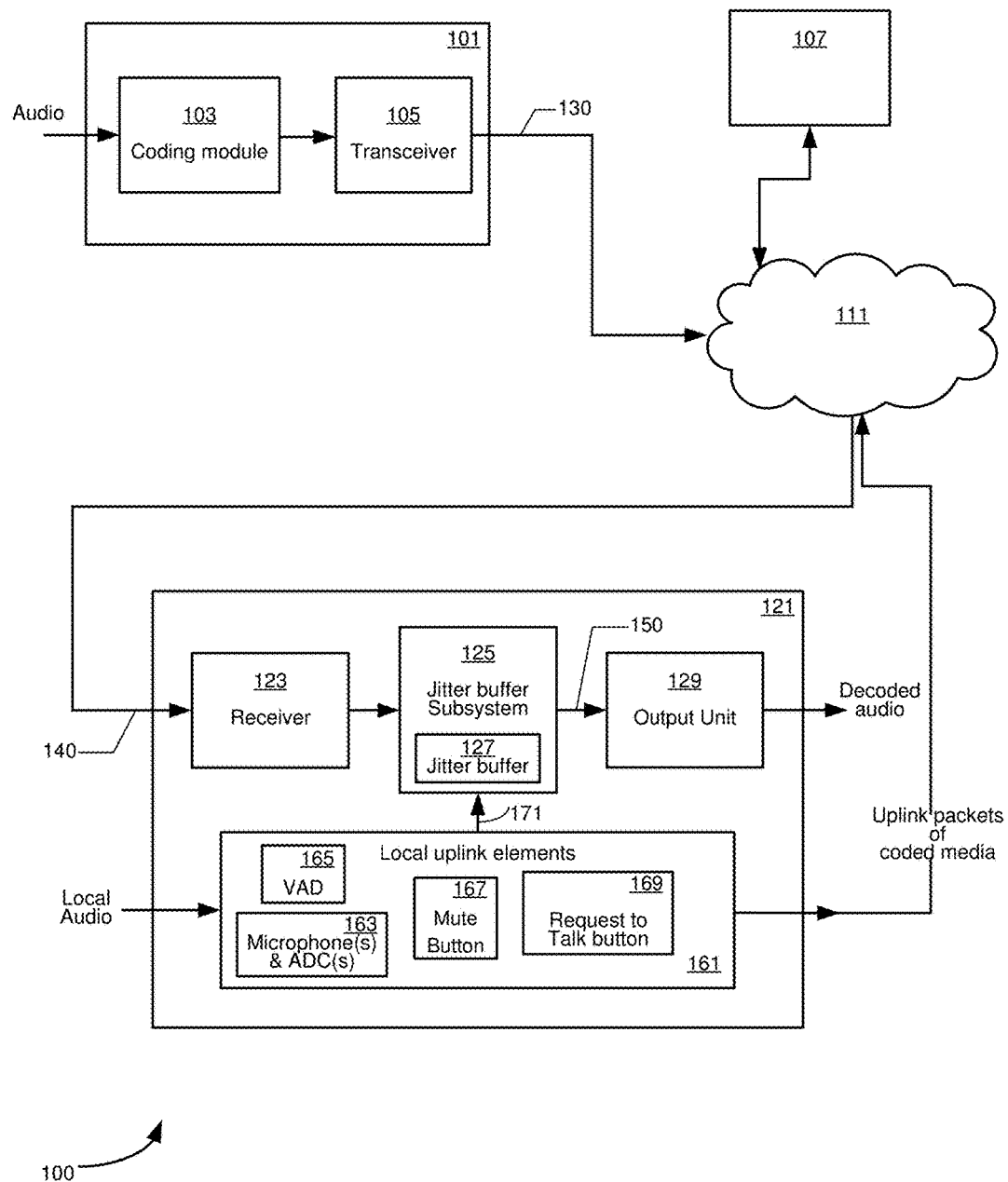
FIG. 1A shows a simplified system that includes an example embodiment of a jitter buffer apparatus.

Described herein is an apparatus operative to process packets of media received from a network, including a receiver unit operative to receive the packets from the network. A jitter buffer data structure is provided for arranging the received packets in an ordered queue. The jitter buffer data structure has a tail into which the packets are input and a playback head defining a point in the jitter buffer data structure from which the ordered queue of packets are to be played back. At least one prototype head is provided having a predetermined latency assigned thereto and defining a point in the jitter buffer data structure from which the ordered queue of packets is played back containing the latency. A processor operable to determine a measure of conversational quality associated with the ordered queue of packets being played back by each prototype head is provided. The processor determines the measure of conversational quality, at least in part, as a function of a measure of predicted listening quality and the predetermined latency. A head selector is operable to compare the measures of conversational quality associated with the ordered queue of packets being played back by each prototype head to select the prototype head with the highest measure of conversational quality. The playback head is then adjusted to match the prototype head associated with the highest measure of conversational quality and the playback unit is coupled to the playback head.

A particular embodiment of the apparatus includes a processor having a plurality of measurement units. Each prototype head may be coupled to an associated measurement unit to determine the conversational quality achieved by each prototype head.

In a particular set of embodiments, the measure of conversational quality of each prototype head by the measurement unit may be a function of both delay and speech impairment for each prototype head. The function of speech impairment may be expressed as a corresponding packet loss ratio provided for each prototype head.

In a particular set of embodiments, a head selector compares the measures of conversational quality for each prototype head by applying the delay and speech impairment of each prototype head to a predetermined model of conversational quality.

Particular example embodiments include a jitter buffering method in an apparatus that comprises a jitter buffer data structure and processing hardware. The jitter buffering method, comprising: receiving packets of media from a network; inputting each received packet into the jitter buffer data structure via a tail, the jitter buffer data structure comprises at least one head defining a point in the buffer from which packets may be played back, the at least one head comprises an adjustable actual playback head coupled to an actual playback unit, and at least one prototype head having associated therewith a predetermined latency; determining a measure of conversational quality associated with each prototype head; comparing the measures of conversational quality for each prototype head to identify a prototype head that provides the highest measure of conversational quality; setting the actual playback head of the jitter buffer data structure to match the prototype head identified as providing the highest measure of conversational quality; and playing back the media via a playback unit.

In an embodiment, the measure of conversational quality associated with each prototype head is determined by coupling each prototype head to a measurement unit to determine conversational quality as a function of both the delay and of a conceal rate of each prototype head.

In a particular set of embodiments, the measurement unit applies the function of both the delay and the conceal rate of each prototype head to a predetermined model of conversational quality to determine the measure of conversational quality for each prototype head.

In a particular set of embodiments, the measures of conversational quality for each prototype head are compared to determine the prototype head having the combination of values of the delay and the conceal rate that provides the highest measure of conversational quality based on the predetermined model of conversational quality.

In a particular set of embodiments, the playback head of the jitter buffer data structure is set to match the combination of values of the delay and the conceal rate of the protoype head that provides the highest measure of conversational quality.

Other sets of the method embodiments include one or more of the aspects described herein for the apparatus example embodiments.

Particular example embodiments include a non-transitory machine-readable medium coded with instructions, that when executed by a processing system in a receiving endpoint, carry out any one of the above summarized methods.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Example Embodiments

FIG. 1A shows a typical system 100 in which the present example embodiment may operate. While the overall structure of FIG. 1A may correspond to known systems, at least the jitter buffer subsystem 125 of the receiving endpoint 121 includes aspects of the example embodiment, and thus, FIG. 1A is not a depiction of a prior art system.

System 100 shows three endpoints 101, 107, and 121 coupled via a packetized communication channel 111, which may be a packet network, for example, the Internet. For ease of description, endpoint 101 may be considered to be a sending endpoint, while endpoint 121 may be considered to be the endpoint receiving packets sent from endpoint 101. In this regard, endpoint 121 may be, for example, part of a call section of system 100, which may be an Internet VoIP system. In the embodiment as show in FIG. 1A, packetized communication channel 111 may be a packet-switched network, for example, the Internet. It will be appreciated by those skilled in the art that in a multipoint conference, each endpoint may be sending and receiving data, and the present description is envisaged to cover such a situation. Furthermore, there may be other elements present within the system 100 that are not shown In FIG. 1A for reasons of brevity and to not obscure the inventive aspects of the present embodiments. In this regard, it is envisaged that the present system may include conference controllers of various kinds, as would be understood by those skilled in the art.

Similarly, for reasons of simplicity, voice communication is assumed with the system of the described embodiments. However, it will be appreciated by those skilled in the art that the embodiments described are also applicable to communication of other types of media content, including video, audio and video, as well as other visual information. Therefore, while speech communication is described herein, this should not be taken to mean that the various example embodiments depicted and described herein should be limited to speech communication.

In accordance with FIG. 1A, audio, including voice, is accepted into the sending endpoint 101, for example, into a VoIP telephone via a coding module 103. In one embodiment, the coding module 103 includes one or more microphones, one or more analog to digital convertors (ADCs), an audio coder to compress the audio, and a packetizer that is operative to packetize the coded audio data into audio packets. The coding module 103 may be further configured to facilitate the insertion of sequence numbers and any other information, for example, timestamps, into the audio packets. Further, a voice activity detector (VAD) or Signal Activity Detector (SAD) may be included in the coding module 103, to insert one or more indicators of voice activity, such as the presence of silence, to the audio packets. The packets are sent, via a transceiver, including a transmit (Tx) network interface 105, to the network 111. In this regard, the sending endpoint module 101 generates an ordered sequence of packets 130 of coded media. The packets of coded media may be in the form of a media stream such as audio data, and the packet sequence 130 may be sent to one or more destinations, for example, to the receiving endpoint 121 via the network 111.

The sequence of packets 130 transmitted from the sending endpoint 101 arrive at the receiving endpoint 121 as a sequence of coded packets 140. In an embodiment, the receiving endpoint 121 may be a VoIP telephone or a VoIP bridge. The sequence of coded packets 140 may or may not correspond to the sequence 130 that was transmitted from the sending endpoint 101. In this regard, the sequence of coded packets 140 received at the receiving endpoint 121 may have some of the packets missing, some of the packets may be received out of order and the packets may have undergone different delays, all this causing what is known as jitter.

The receiving endpoint 121 includes a receiver or receive (Rx) network interface 123 that receives the packets 140 coupled to a jitter buffer subsystem 125 that uses jitter buffering, namely, that includes a jitter buffer data structure, hereinafter referred to as a jitter buffer 127. The purpose of the jitter buffer subsystem 125 is to compensate for the jitter introduced by the network 111 such that after a delay introduced by the jitter buffer subsystem 125, the media stream is output from the jitter buffer subsystem 125 as an ordered sequence 150 of packets to an output unit 129 including a decoder, a conceal processor in those embodiments that conceal missing packets, a forward error control unit in embodiments that include forward error control, and for playback, one or more digital to analog converters (DACs) and one or more amplifiers and loudspeakers that when operating, play back the sequence 150 in real time. In such a system, the latency is low, and the playback is predominately without perceptible gaps or stutterings.

In one embodiment, the sending endpoint 101 is implemented using a first computer running a first VoIP soft-client software application. Such an implementation executes a set of instructions that are coded, for example, stored in a non-transitory medium, such as the computer's memory.

In one embodiment, the receiving endpoint 121 is implemented using a second computer running a second VoIP soft-client software application. In this implementation, the software application executes a second set of instructions that are coded, for example, stored in a non-transitory medium, such as the second computer's memory. Note that the second VoIP soft-client software application may be another instance of the same VoIP soft-client software application as in the first VoIP soft-client software application of the sending endpoint 101. In this regard, the output unit 129 of the receiving endpoint 121 may use audio output hardware stored in the second computer. In other embodiments, the receiving endpoint 121 may be a teleconferencing server or bridge, as will be appreciated by those skilled in the art.

Some embodiments of the receiving endpoint 121 may also include local uplink elements 161 to enable the receiving endpoint 121 to also accept audio and send uplink packets of coded media. The endpoint 121, for example, may include in uplink elements 161: one or more microphone and ADC combinations 163, and may also include one or more of: a local mute button 167 (or equivalent) to mute the one or more microphones 163 thus providing indication within endpoint 121 on engagement and/or disengagement of the local mute button 167; a VAD (or SAD) 165 providing indication within endpoint 121 on local voice activity; and/or an explicit "request to talk" button 169 or equivalent providing indication within endpoint 121 on engagement and/or disengagement of the "request to talk" button. These elements may be provided in varying combinations within the endpoint 121 to provide the jitter buffer subsystem 125 access to information 171 on near end speech.

Figure 1B:
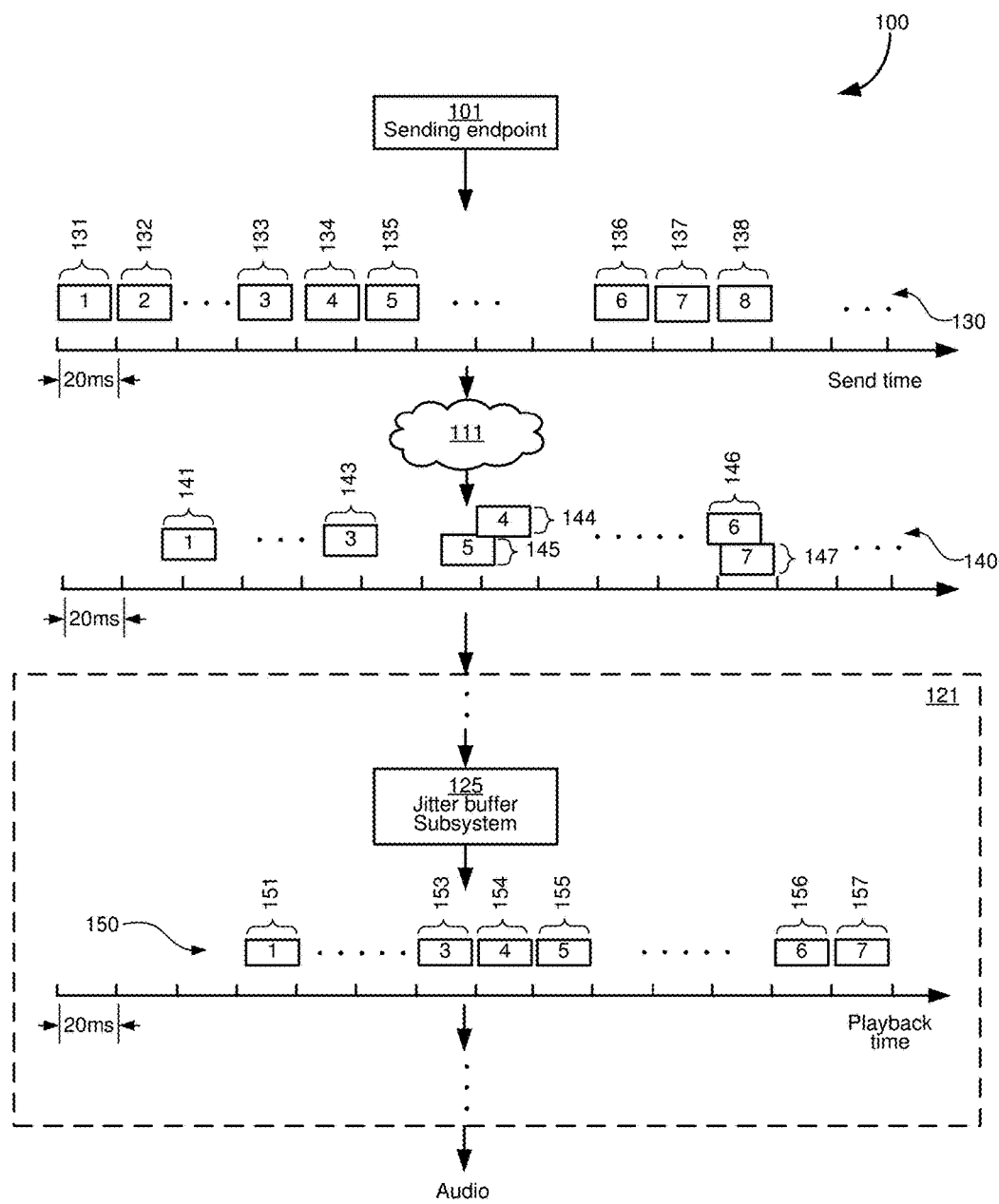
FIG. 1B shows in simplified form an example data flow within the system of FIG. 1A, starting with a packet sequence sent from a sending endpoint, and the data flow within a receiving endpoint according to an example embodiment.

Referring to FIG. 1B, there is shown, in simplified form, the data flow within the system 100. The data flow commences with the sequence of packets 130 generated at the sending endpoint 101, which may be a VoIP telephone, being transmitted to the receiving endpoint 121, which may be a VoIP telephone or bridge playback unit in system 100. The sequence of packets 130 are sent at regular time intervals determined by a dedicated timing source. In an embodiment, the sequence of packets are sent every 20 ms thereby forming 320 sample periods when the ADC (or ADCs) in the coder module 103 of sending endpoint 111 is configured to sample at 16000 samples per second. The audio signal containing voice may be conventionally partitioned into frames, for example, of 20 ms of audio, and coded by an encoding method, and packetized into the packets having the sequence 130. In the example described herein, each packet carries one 20 ms frame of encoded media, for example, voice encoded using ITU-T rec. G.722 standard encoding, although the example embodiments are certainly not limited to any particular encoding method or packetization scheme, or even to audio. The audio is packetized for sending between endpoints such that a sequence of packets is sent. In a DTX (discontinuous transmission) system, two consecutive packets may have a period of silence between each other, or may be within the same talk spurt. Each packet may be provided with a sequence number, for example, 1, 2, 3, 4, 5, 6, 7, 8 . . . , which allows a receiving endpoint, such as endpoint 121 to re-order the packets as they are received into their correct order for playback. This provides for the receiving endpoint 121 to determine whether packets are missing.

In the embodiment as depicted in FIG. 1B, the sequence of packets 130 includes packets 133-135 which may be packets from one talk spurt which have been given sequence numbers 3, 4, and 5. Packets 136 and 137 with sequence numbers 6 and 7 show, for illustrative purpose, packets from a second talk spurt. In this particular embodiment, the system 100 is assumed to operate in DTX mode where packets are only sent when there is voice activity. In the illustrative example, it will be assumed that there is no voice activity in the timeslots between packets 135 and 136, namely packets with sequence numbers 5 and 6, so that no packets were sent by the sending endpoint 101 in those timeslots.

As the packets traverse the network 111 to the intended receiving endpoint 121, they may experience a delay that may result from any of a variety of reasons. The delay may result from the route taken, with circuitous routes taking longer than direct transmission routes. As a result, at the receiver, the packets may arrive with different delays and possibly out-of-order, and in some instances, some packets may be lost during transmission. In the specific embodiment depicted in FIG. 1B, the packets that were received by the endpoint 121 are shown as a sequence of media stream packets 140 arriving at a receiving endpoint 121, which may be a VoIP telephone or conference bridge. As depicted, the order of receipt of the packets is not the same as the order in which the packets were sent, and for packets 132 and 138, these packets have been lost altogether. As a result, in sequence 140 that is received by the receiving endpoint 121, packets 143-145 with sequence numbers 3, 4, 5 are from the first talk spurt. However, packet 145 with sequence number 4 has been delayed sufficiently so that it arrives after packet 145 with sequence number 5. This is an out-of-order arrival. Further, received packets 146 and 147 with sequence numbers 6 and 7 are from the second talk spurt. However, packet 146 with sequence number 6 has been delayed enough such that it arrives immediately before packet 147. This results in a sequence and spacing of received packets 140 that is significantly different to the sequence 130 of packets transmitted by the sensing endpoint 101.

In accordance with an example embodiment, the jitter buffer subsystem 125 includes a single packet buffer, for example, a single packet queue 127 that contains the arriving packets. The arriving packets are inserted into the packet queue 127 at a tail index location, herein called the "tail" of the single packet buffer queue 127. Each packet is inserted into the single packet buffer queue 127 at the time the packet arrives, without undergoing any silence compression or expansion. The buffer queue 127 may include one or a plurality of heads. In one embodiment, the buffer queue 127 includes a plurality of heads, referred to herein as prototype heads, each representing a pointer location in the buffer queue 127, from which packets could be read out to achieve a different one of a set of associated latencies. Each latency for each prototype head may be achieved by applying silence compression or expansion, and/or other actions at the time each packet would be read out from the packet queue 127 from that head. The method determines (over a time interval) the performance that would be achieved by using each of the prototype heads based on a measure or estimation of actual listening quality.

The output packets are played back at a regular rate, for example, every 20 ms according to a predetermined timing source, for example, every 320 sample periods when the DAC (or DACs) of output unit 129 is configured to sample at 16000 samples per second. Such regular rate is also used when determining the performance achievable using each of the prototype heads.

In such a system, any actions to be applied to the packets, such as silence expansion or contraction, are carried out at packet readout time. This has the advantage of not committing what latency to use or how the latency is achieved until the readout time. Further, the determination of the listening quality of each prototype head is based on measures or estimates of actual performance. In the embodiment as depicted in FIG. 1B, there is depicted a readout sequence 150. In this sequence, packets 153-155 (sequence numbers 3, 4, and 5) are from the same first talk spurt. Note that in the sequence 150, the jitter buffer subsystem 125 has put the packets back into correct sequence number order. In this regard, Packets 156 and 157 (sequence numbers 6 and 7) are from the second talk spurt and it should be noted that in the readout sequence 150, there is a gap of three timeslots between playback of the first and the second talk spurts, the same as the gap of three timeslots when they were sent by sending endpoint 101.

Figure 1C:
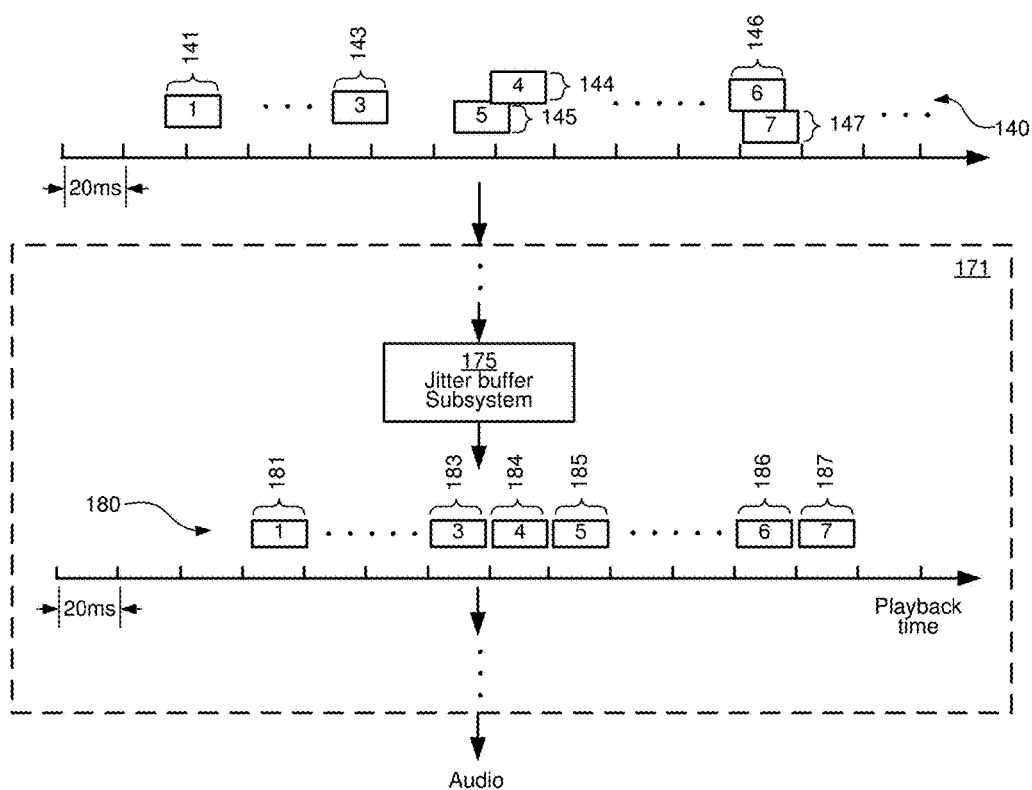
FIG. 1O, which shows an example data flow that might occur in a conventional endpoint with a conventional jitter buffer subsystem in contrast to an endpoint that operates according to an example embodiment.

The embodiment of FIG. 1B is to be viewed in contrast with that shown in FIG. 1C, which shows an example of what might happen in a conventional endpoint 181 with a conventional jitter buffer subsystem 175. The buffer subsystem 175 includes a playback packet queue. As described hereinabove in the "BACKGROUND" section, once a target latency is pre-set, silence compression or expansion is carried on the received packets out at the time the packets are inserted into the playback packet queue in order to achieve the desired pre-set target latency. In such a system, if the queue order of packets lead to undesired effects, there is no means of rectifying the situation. An example result of processing by a conventional jitter buffer subsystem 175 is shown as packet sequence 180 of FIG. 1C, which is played out of the packet queue at regular speed. Due to the processing steps required during the insertion of the packets as they arrive and are placed into the packet queue, the order of the sequence of packets has been corrected from that shown sequence 140. In this regard, packets 183-185 (sequence numbers 3, 4, 5) are packets associated with the first talk spurt and packets 186 and 187 (sequence numbers 6 and 7) are packets associated with the second talk spurt. These packets are depicted in the correct order in sequence 180. However, it should be noted that there is a gap of two timeslots between playback of the first and the second talk spurts, compared to a gap of three timeslots when they were originally sent from the sending endpoint, as shown in FIG. 1B. This reduction in the time interval between the first and second talk spurts is due to the jitter buffer subsystem 175 performing silence compression in order to reduce the latency of the system to match the pre-set target latency. There is no means by which the performance of the system is assessed against measures or estimates of actual performance.

In contrast to this conventional approach of deciding what silence compression or expansion to apply at the time the packets are inserted into a playback queue, an example embodiment uses a single jitter buffer data structure 127 of packets, the jitter buffer data structure 127 having a single tail wherein arriving packets are inserted, and one or more—typically more than one—prototype head(s) from which packets may be removed for playback. Each prototype head may be associated with a typically distinct latency. The proposed jitter buffer subsystem 125 is then operable to track the performances of the system over time and generate a performance measurement for each prototype head that measures or estimates actual listening quality which would result should each prototype head be used, and is then operable to choose the prototype head characteristics that provides the best listening quality, taking into account the tracked performance and the resultant latency. The resultant chosen playback head characteristics are then used by an actual playback unit at an actual head of the packet, such that the playback unit provides the final packet stream 150 for playback via the output unit 129, with the jitter buffer subsystem 125 having the chosen latency and listening quality. In this arrangement, the decision as to what latency and resultant listening quality the jitter buffer subsystem 125 has, is made at the time that packets are extracted from the buffer at buffer readout time and is based on a performance measure for selecting a desirable listening quality of the prototype heads for the buffer that measures or estimates actual performance. This is conducted in preference to such systems which require that the target latency choice is made at the time packets are inserted into a jitter buffer data structure 127, as is done with a traditional jitter buffer.

Figure 2:
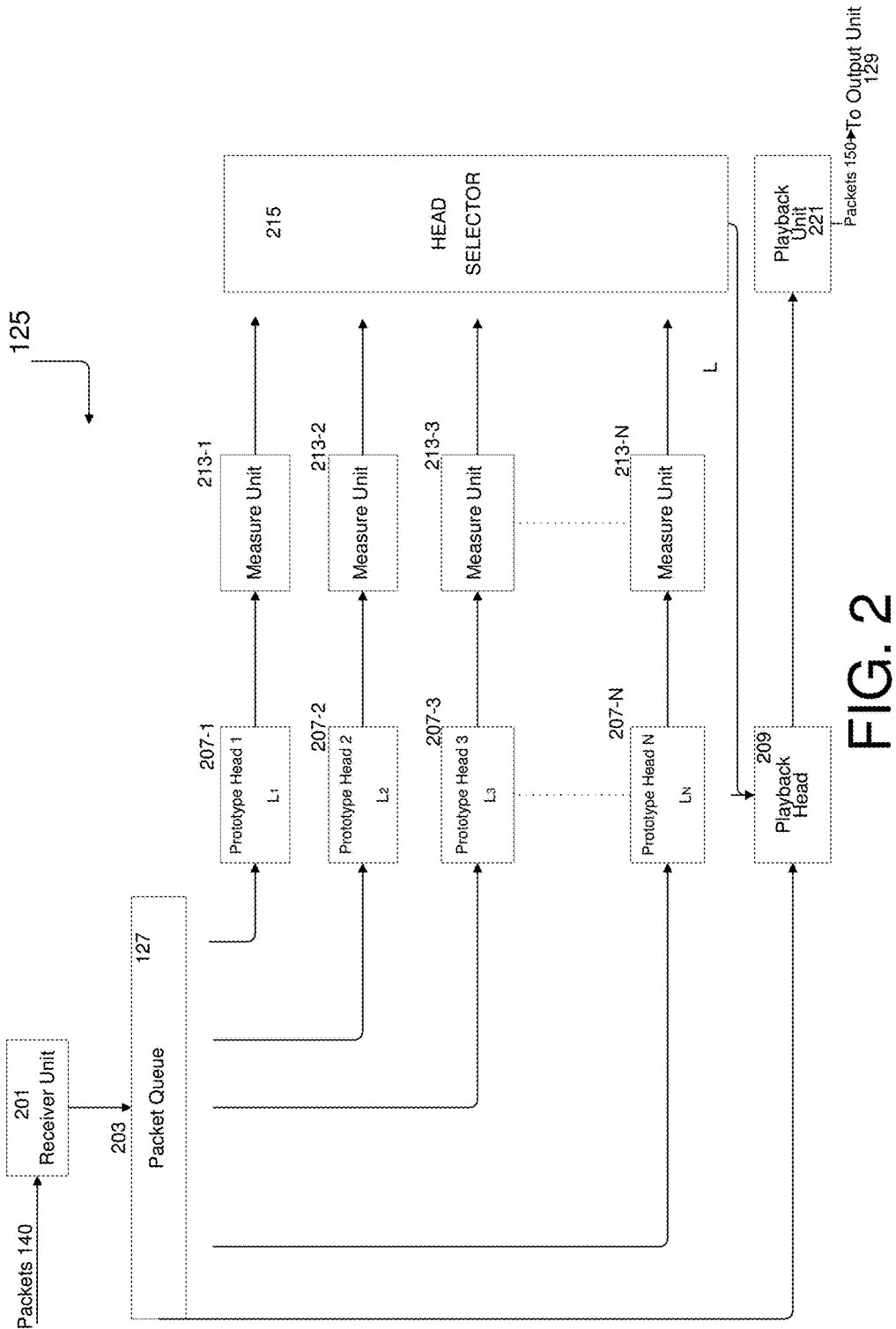
FIG. 2 shows a simplified block diagram an example embodiment of a jitter buffer subsystem.

FIG. 2 shows a simplified block diagram of an embodiment of a jitter buffer subsystem 125. The jitter buffer subsystem 125 includes a receive unit 201 operable to receive the packets 140 from the network interface 123 of the receiving endpoint 121 (FIG. 1A). A jitter buffer data structure 127 (hereinafter referred to as the packet queue 127) includes a tail 203 wherein packets are inserted upon receipt. The receive unit 201 additionally determines the location of the tail 203, namely, where to put each packet in the packet queue 127 based on a function of the difference in sequence numbers of the most recently received packet and the highest sequence number of the packets received, which are known to be in the packet queue 127. This has the effect of re-ordering packets in such cases where the packets are received in an out-of-order mode. Note that in practical systems, only a few bits, typically 8-bits, is available for the sequence number, so the sequence number can wrap during the arrival of the packet sequence 140. Hence, appropriate definitions of "difference" and "highest" are required to be used. In some embodiments, the receiver unit 201 may include a receive clock 202 to add a receive timestamp to arriving packets. In such embodiments, the difference between receive times as determined by a comparison of the receive timestamps is used to determine whether a sequence number has wrapped for systems that use a small sequence number, for example, 8 bits. Such implementation details would be clear to those skilled in the art, and will not be described in any further detail.

In one embodiment, only one copy of each received packets 140 is maintained in the packet queue 127.

The jitter buffer data structure 127 (hereinafter a packet queue 127), includes at least one prototype head, in addition to the tail 203. Each prototype head defines a point in the buffer from which packets might be played back to achieve a desired listening quality. The number of prototype heads is denoted by N (N≥1) and the associated latency of the i'th prototype head is denoted by Li, i=1, . . . , N.

FIG. 2 shows the N prototype heads as heads 207-1, 207-2, 207-3, . . . , 207-N and the respective prototype target latencies of these heads as L1, L2, L3, LN. Information about the packets from each head is coupled to a corresponding measure unit 213 denoted 213-*i*, where i=1, . . . , N each of which determines a measure of sound quality associated with each prototype head. The measure of sound quality associated with each prototype head may be a measure of conversational quality that a respective head i would produce where it to be used as a playback head with that prototype head's latency, Li. Each of the measure units 213-1, . . . , 213-N, determine corresponding sound quality for each respective head comprising a corresponding function of delay and of speech impairment. The speech impairment may be expressed as a corresponding packet loss ratio provided for each respective head by statistics of the packets or indicators determined to be output at each head by the respective decision logic.

In one embodiment, the first set of packet indicators includes a "normal" packet indicator that indicates that the packet is a normal packet, namely, the packet payload and an FEC packet indicator to indicate the FEC (forward error-correction) that is to be applied using the received packets to determine what payload to output when the data is played out from the buffer during actual playback time. The second set of packet indicators includes a "silence" packet indicator (hereinafter a "silence") that might be output after the end or prior to the start of a talk spurt to indicate that to achieve the required latency would require inserting a silence at this timeslot, and a "conceal" packet indicator (hereinafter, a "conceal") to indicate that there is a packet missing, such that a conceal operation would need to be performed at the actual playback time if that prototype head was to be set as the actual delay to use during actual playback.

A head selector or comparator 215 functions to compare the sound quality determined for each prototype head to determine the prototype head that provides the highest measure of sound quality, for example, conversational quality. The jitter buffer data structure 127 includes an adjustable playback head 209 from which the packets are actually removed from the jitter buffer data structure 127 using the selected prototype head characteristics. The adjustable playback head 209 is coupled to an actual playback unit 221 and the head selector 215 selects a latency L, which is latency of the selected prototype head, for playback by the playback unit 221. In this regard, the playback unit 221 is coupled to the playback head 209 to carry out the actions needed, whereby at the start of each talk spurt in order for the playback unit 221 to achieve the selected latency L, it outputs at each timeslot (every 20 ms in one embodiment) (a) a packet, (b) a packet and either a normal indicator or an FEC indicator, or (c) no packet and either a silence or a conceal. Such actions are the same as the selected prototype head's characteristics assumed made at each output timeslot to determine best measure or estimate of actual performance. In this manner, the particular latency L of the jitter buffer subsystem 125 is determined at buffer readout time rather than at buffer input time.

The result of the playback unit 221 is the final output packet sequence 150 from the jitter buffer subsystem 125. This output packet sequence 150 is then decoded, conceals performed where necessary, FEC performed when indicated, and the packets converted to an analog audio signal using the one or more ADCs for playing to a user by the an output unit 129.

In order for the head selector 215 to properly select the prototype head that provides the best measure of conversational quality, the head selector 215 must ensure that even the packets that would be extracted from the prototype head that has the longest delay have been taken into account by the measure unit of that longest-latency prototype head. That is, the jitter buffer data structure 127 needs to have therein all the packets whose information is used by all the measure units whose performance needs to be taken into account. Reference counting on the packets can be used to ensure the packet remains in memory until all measure units have finished with it. One embodiment carries this out by maintaining a reference count for each packet as the packet remains in the jitter buffer data structure 127. The reference count for a packet is initially, when the packet is received and enters the packet queue 127, set to one more than the number of prototype heads, for example, to N+1. Each time information of that packet is used by any one of the N measure units, the count is decremented by 1. This provides a means for indicating when that packet would have reached the longest latency prototype head, such that the reference counts make sure that the best prototype head is selected only when all the heads' packets have been considered.

It will be appreciated that such an embodiment requires information on when a packet enters the packet queue 127. This may be achieved by the jitter buffer subsystem 125 having an information link located between the receiver unit 201 and the measure units 213. Also, as would be understood by those skilled in the art, the information maintaining aspects of the receiver unit 201 may be considered to be part of the decision logic. Note that the information link may also be used to transmit receive timestamps from clock 202 present in the receiver unit 201 and in those embodiments that use such a receive timestamp information not only in the reordering by the receive unit 201, but also in the decision logic 211.

For illustrative purposes, it is herein assumed that the measurement made by each measure unit 213-$i$ ($i=1, \ldots, N$) is expressed as a measure of conversational quality. Such a performance measure for each head may refer to model of conversational quality whereby a point on that model, arrived at by the measure unit processing input into that model, is a measurement. An example of such a measurement will be described in more detail below. The measure of conversational quality is determined in part, by a measure of predicted listening quality and latency for each head. As the corresponding function of delay being output by each prototype head is known, the function of sound quality is expressed as a corresponding packet loss ratio provided for each prototype head by statistical analysis of the packets or indicators output at each prototype head by the corresponding measure unit 213. Thus, it will be appreciated that the performance measure is a quality measurement that is a monotonically non-decreasing function of the quality of the sound were that prototype's head used for actual playback.

In a typical simple embodiment, the set of indicators being output from each prototype head includes the number of silence indicators and the number of conceals that would have been generated using that prototype head over the pre-defined time interval. One such example of a function of the number of conceals is a linear function of the number of conceals, for example, the actual number of conceals. In some applications, the function of the conceals is proportional to the packet loss ratio that would be achieved using the associated prototype head over the pre-defined time interval. In other applications, the set of indicators may include the number of apply-error-correction indicators or forward error-correction (FEC) indicators generated using the associated head over the pre-defined time interval.

The function of speech impairment can be determined by analysis of the above referenced set of indicators determined to be output at each prototype head to be expressed as a corresponding packet loss ratio. In this regard, the performance measurement made by the measure unit for each prototype head can be considered as a joint function of both delay and speech impairment.

Selecting the Actual Head

Referring to FIG. 2, the head selector 215 receives from the measure units 213 a current set of generated performance measurements for each prototype head. As previously discussed, the corresponding performance measurements for each prototype head comprise a function of both delay and of speech impairment or conversational quality.

For each measure unit 213, conversational quality is the measurement upon which head selection is based. This measurement is realized by a model of conversational quality. An example of such a model is depicted in the iso-preference contour Graph, referred to as FIG. 5 below. This model requires two inputs: PLR (Packet Loss Ratio) and delay. By knowing these parameters for each prototype head a measurement can be made which equates to a point on a contour, with each prototype head having one point or measurement. The model is at least 2D with one dimension being related to speech/listening quality (without regard to delay) and the other being delay. For FIG. 5, this is a 2D model whereby PLR is the measurement upon which listening quality is evaluated. This is perhaps the simplest model that can be used. However, it is also possible to make more complicated measurements where PLR may be combined with bustiness factor (BF) or where PLR/BF is combined with how much speech energy is erased by the losses. Irrespective of the model used, each prototype head will provide a measure of listening quality (which can be equated to a point on an axis) and will also have a delay, both combining to identify a point on a contour plot that provides a real measure of conversational quality. It will also be appreciated that the measurement could be of a higher dimensionality. In such instances, a model having a different contour based on observed interactivity could be used whereby a measure of conversational quality could be determined by measuring listening quality, delay and interactivity.

In some embodiments, a 2-D or 3-D look-up table may be pre-stored for comparing and assessing the determined corresponding performance measurements generated for each head against a predetermined numerical model. The predetermined numerical model may be generated through performing subjective behavioral testing of individuals across a variety of different situations and determining how the human subjects simultaneously value delay and conceal rate against performance. Such tests may be carried out on sets of human subjects using a system whereby the delay and packet loss ratio of the transmitted conversation can be adjusted independently, with the subjects conducting a series of conversations across each different combination of delay and packet loss ratio. The subjects then report on the quality of the result, on an absolute category rating scale. The ratings for each combination by the subjects can then be processed to yield a look-up table or graph that assesses the quality for each pair of delay and speech impairment combinations.

Figure 5:
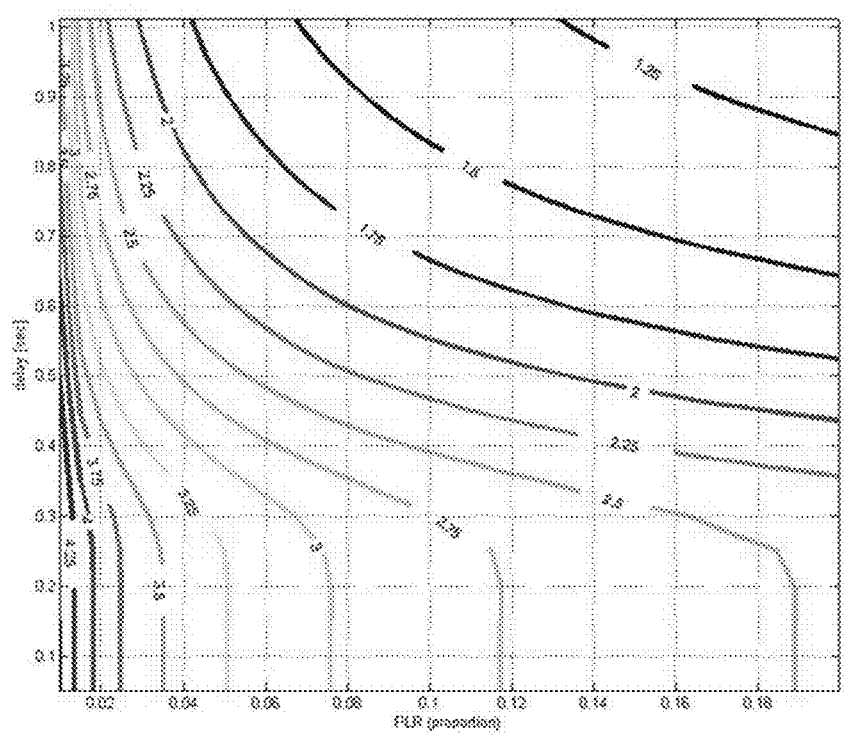
FIG. 5 depicts graphically an example of a look-up table such as a iso-preference contour graph in accordance with an example embodiment.

Referring to FIG. 5, a graph is provided which graphically analyzes the results and plotting delay against a conceal rate. In particular, the graph shown in FIG. 5 generates a plurality of iso-preference contours that directly measure how to trade-off delay and conceal rates to increase conversational quality. For example, if the delay is 0.35 sec and the conceal rate is 0.08 PLR, should the delay increase to 0.7 sec there would need to be a corresponding drop in conceal rate to 0.02 PLR to maintain the same listening quality of 2.75.

It will be appreciated that by providing a graph which functions as a look-up table such as FIG. 5, it is possible to provide a jitter buffer that is able to take into consideration an empirically generated model of how human subjects simultaneously value delay and conceal rate in a conversation environment to control the quality of the experience.

It will also be appreciated that, rather than an empirically generated model, the look-up table may be based on existing models, such as the ITU Standard E-model, which is a computational model established by the International Telecommunication Union (ITU) used by transmission planners to determine end-to-end transmission performance and standardized in ITU G.107. The E-model is a computational model established to produce an output that is a transmission rating factor R, that varies directly with the overall conversational quality. Thus the transmission rating factor R combines all transmission parameters relevant to a connection such that the head selector 215 can select the best R rating rather than merely the "lowest cost" function.

Such a model may be used to calculate the speech impairment function resulting from an observed pattern of packet loss. The model takes into consideration the packet loss rate, the "burst factor" which is a method of the distribution of the losses, together with a codec specific value that describes how severely a codec is affected by packet loss, which is a type of packet loss robustness factor. Thus a speech impairment function or measurement M can be considered as a vector of each of these three elements:

$$M = \langle \text{packet loss rate, burst factor, packet loss robustness factor} \rangle$$

Similarly, the ITU Standard E-model can be used to determine the impairment caused by the delay. This can involve taking into consideration the delay through the system as being a sum of the latency L of the jitter buffer as well as any other delays in the system, such as delays resulting from routing/transmission, coding or processing for audio enhancement, and the like. As such the impairment caused by the delay can be added to the impairment caused by the packet loss to establish an overall impairment measurement M.

Irrespective of the manner in which the performance measurements M are established, the head selector 215 is able to take the performance measurements for each of the one or more prototype heads and utilize the set of values of the delay and the speech impairment (packet loss ratio) for each head to assess the values against the look-up table, based on the perceived conversational quality or actual performance of the system.

The head selector 215 is then able to select the prototype head having the combination of values that provides the best conversational quality or actual performance rather than merely the lowest "cost".

Interactivity in the Endpoint 121

It will be appreciated that in some embodiments of the receiving endpoint 121, the receiving endpoint 121 may be capable of acting as a sending endpoint and may include hardware similar to that of sending endpoint 101 of FIG. 1A. As depicted, endpoint 121 includes local uplink elements 161 that may including one or more microphone and ADC combinations 163, a local mute button 167 (or equivalent) to mute the one or more microphones 163 thus providing indication within endpoint 121 on engagement and/or disengagement of the local mute button 167; a VAD (or SAD) 165 providing indication within endpoint 121 on local voice activity; and/or an explicit "request to talk" button 169 or equivalent providing indication within endpoint 121 on engagement and/or disengagement of the "request to talk" button. These elements may be provided in different combinations of the endpoint 121 to provide the jitter buffer subsystem 125 access to information 171 on near end speech.

In an embodiment of the system 100, the decision logic may be able to perform conversational analysis over a time window spanning a relatively long interval time, for example, tens of seconds, to classify the level of interaction in the current (time portion) of the activity of the endpoint 121, namely, the activity in a conference in which the endpoint 121 may be participating.

In some embodiments, the decision logic is operative to classify the level of interactivity of the endpoint 121 into one of a set of different classes. Various embodiments for achieving this may include defining different sets of classes, and different methods of determining interactivity. As an example, different situations for which different classes might be defined include passively listening to a presentation, having a highly interactive conversation, all endpoints mutually silent waiting for speech, and so forth.

Thus, in some embodiments, the apparatus includes a mechanism operative to determine or receive a discrete measure of interactivity V and may include corresponding look-up tables used by the head selector 215 to select the appropriate performance measurements, which may also depend on the determined measure of interactivity.

In one such set of embodiments, the mechanism for receiving the measure of interactivity may include an interactivity analyzer that, when operating, determines a measure of interactivity using information provided on near-end activity.

In some embodiments, the receiving endpoint 121 may include uplink elements that provide an uplink talk flag indicating local input for uplink. In some such embodiments, the determination of the measure of interactivity includes performing an analysis of the relative amount of time the uplink talk flag is used over the interactivity-analysis time-interval.

In some versions, the uplink flag may be the output of a voice activity detector (VAD) or Signal Activity Detector (SAD) 165 in the receiving endpoint 121.

In this regard, many telephony devices equip both software and hardware with a local mute switch, shown as mute 167. Users of such devices have become accustomed to engaging the mute switch when listening to long presentations from far end talkers. Therefore, the act of disengaging the mute switch 167 may be construed as an indication that the local talker intends to speak. As a result, a signal may be supplied to the jitter buffer decision logic indicating that that the head selector 215 should select a prototype head having a relatively short delay to allow interactivity to occur within the system.

Thus, in some versions, the receiving endpoint 121 can also send information and may include a microphone-mute switch which can be used to provide an indication of the measure of interactivity occurring within the system. Thus, this can be achieved by using information about a state of the microphone-mute switch of the receiving endpoint in which the jitter buffer subsystem 125 is included. In some embodiments, information about the state of use of the microphone-mute switch may include an indication of the disengagement of the microphone-mute switch. In some versions, the indication of disengagement of the mute switch indicates a desire to talk.

For large conferences involving a number of participants, it may be desirable to include a question and answer session among the participants. In such an embodiment, a button may be provided which can be activated by a user of a VoIP application to register that he or she wishes to ask a question. In such an embodiment, a queue of registered questions would be maintained by the system such that when it comes time for a user to ask his or her question, the jitter buffer may be altered more in favor of interactivity over quality.

According to one embodiment the receiving endpoint 121 may include uplink elements 161, such as a request-to-talk switch. In such an embodiment, the determining of the measure of interactivity may include using information about the activity associated with the request-to-talk switch.

In other embodiments, the determined measure of interactivity may be indicative of a conversational class from a set of distinct conversational classes.

In some versions, the set of distinct conversational classes may include a low-interactivity class and a two-way conversation class. The two-way conversation class may indicate that there is activity in both the uplink and the downlink. It will be appreciated that in this embodiment, two-way conversation is not limited to a conversation with a single second party, but rather includes the case of a multi-party conference.

In some versions, more than two sets of conversational classes may be included, for example, the set of classes may further include an essentially-no-interactivity class, and a moderate-interactivity class.

A Method Embodiment

Particular example embodiments include a method 300 of jitter buffering in an apparatus such as a receiving endpoint. The apparatus might be a hardware receiving terminal, or may be implemented on a processing system.

Figure 3:
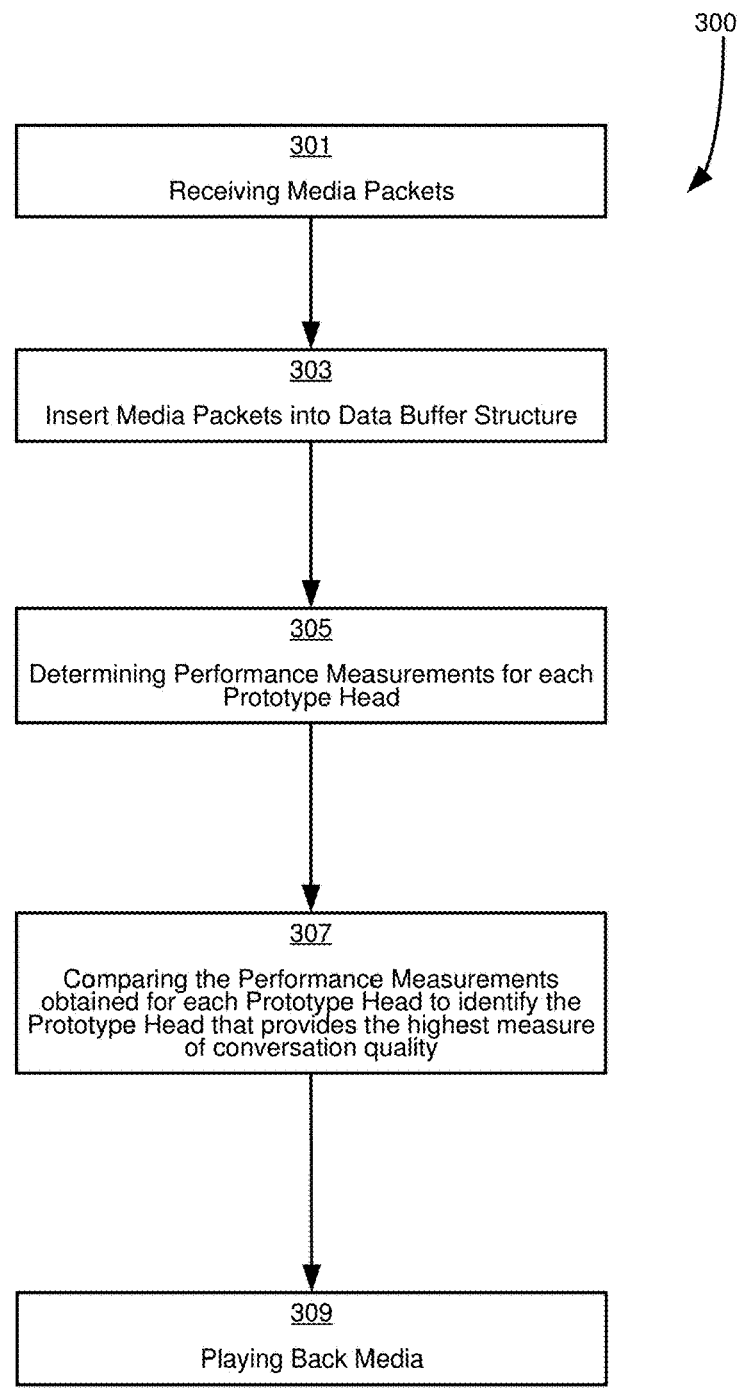
FIG. 3 shows a simplified flowchart of an example embodiment.

FIG. 3 shows a simplified flowchart of a method embodiment 300 that includes in 301 receiving packets 140 of media from a network 111. The received packets may have been packets 130 sent from a sending terminal that includes one or more microphones to process audio, for example, speech. The received packets include a payload and bookkeeping information, including an indicator of packet order, such as a sequence counter or a sending timestamp. The received packets also may include a start of talk spurt indicator, an end of talk spurt indicator, or both an end of talk spurt and a start of talk spurt indicators. Such indicators may be generated from a VAD (or SAD) in the sending endpoint 101.

The method 300 includes in step 303 for each received packet, inserting the received packet into a buffer data structure 127 via the single tail 203 of the buffer data structure 127. The buffer data structure 203 includes at least one prototype head (207-1, . . . , 207-N for N prototype heads, N≥1), each prototype head defining a point in the buffer wherefrom packets could be played back (but are not for the purpose of selecting the actual head). Associated with each prototype head is a latency to be achieved if the packet were extracted via that head.

The method includes in 305 determining, at a set of time instants, a respective performance measurement for determining a measure of conversational quality for each prototype head. The performance measurement being a function of both the delay and the speech impairment that would be achieved by outputting at each prototype head one of: a packet, a packet and a content indicator of a first set of content indicators, and no packet and a content indicator of a second set of content indicators.

In step 307 the method further includes comparing the performance measurements obtained from each prototype head to identify the prototype head that provides the highest measurement of conversational quality. Thus, determining the location for an actual playback head 209 of the buffer data structure from which packets are extracted for actual playback via an actual playback unit. In this manner, the method determines the actual target latency of the jitter buffer data structure at buffer readout time rather than at buffer input time with this being based on measures or estimates of actual performance and quality.

In step 309, the method further includes playing back the media via the actual playback unit.

As in the apparatus sets of embodiments, the first set of packet indicators includes a "silence" packet indicator (hereinafter a "silence") and a "conceal" packet indicator (hereinafter, a "conceal."). A further set of indicators may include and an FEC packet indicator to indicate that FEC (forward error-correction) has been applied to the packet.

Other sets of the method embodiments include one or more of the aspects described above for the apparatus embodiments.

Processing System Embodiments

While a receiving endpoint 121 that includes an example embodiment can be realized, for example, using special purpose hardware, some implementations of the receiving endpoint include a processing system.

Figure 4:
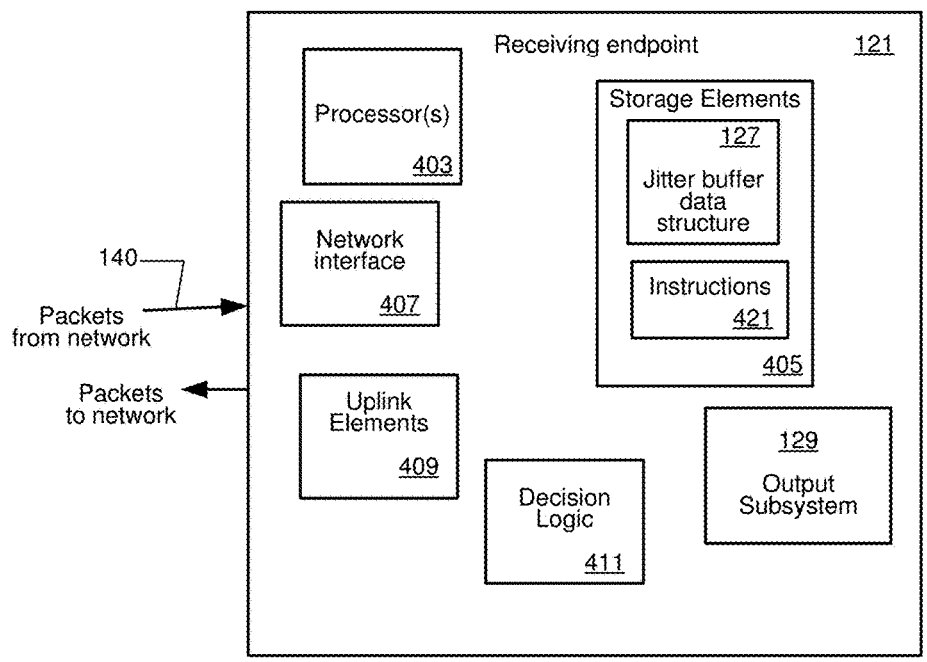
FIG. 4 shows one implementation of a receiving endpoint that includes a processing system in accordance with an example embodiment.

FIG. 4 shows a simplified block diagram of an embodiment of a receiving endpoint 121 that includes a processing system. The embodiment includes one or more processors 403 and a set of storage elements 405, typically in the form of memory elements. The jitter buffer data structure 127 is arranged as one element of the storage element 405. The endpoint embodiment further includes a network interface 407 that is operable to accept packets of media from the network 111. The network interface 407 may also, on the uplink, send packets of media.

The processor-based endpoint embodiment further includes such uplink elements as one or more microphones (mics) and ADCs 409, and other uplink elements as deemed necessary.

The functions of the receive unit 201, the decision logic 411, and the playback unit 221 are carried out by executing software, shown as instructions 421 in the storage subsystem 405. Elements of the output subsystem 129 also are included for playing back the media, including DACs in combination with loudspeakers. The instructions 421 also may include instructions for operating other aspects of the receiving endpoint 121. Not shown in FIG. 4 are such elements as a bus subsystem for coupling the shown elements, and some other standard elements that would be included in a processing system and in an endpoint as would be appreciated by those skilled in the art.

Thus, particular embodiments include a non-transitory machine-readable medium (as part of storage subsystem 405) coded with instructions (part of 421), that when executed by a processing system (the processors 403 and other elements of the endpoint), cause the endpoint to carry out any one of the above summarized methods, and also to implement some embodiments of the buffer subsystem as described above.

Generalizations

In the case of audio, note that while the G722 ITU-T recommendation was mentioned in the embodiments above, with frames that are 20 ms long, and packetization that includes a single frame per packet, the example embodiments are not so limited. For example, the embodiments may be used for video as well as audio, and in the case of audio, in any method of coding and packetizing audio into packets of digitized audio information. Some known audio coding standards/methods and the name of their introducer include, but are not limited to: AMR, AMR-WB—now ITU-T G.722.2, and AMR-WB+(3GPP); ALAC (Apple Inc.); apt-X (APTX); SBC (Bluetooth SIG); BroadVoice: BV16& BV32 (Broadcom); WavPack (Conifer Software); Codec2 (David Rowe); AMBE (Digital Voice Systems); AC-3 and Enhanced AC-3 (Dolby Laboratories, inc.); GSM-FR (ETSI Special Mobile Group); Musepack (Frank Klemm/MDT); iLBC and iSAC (Global IP Solutions); Opus (IETF); AAC, ALS, MP2 (MPEG-1, 2 Audio Layer II), and MP3 (ISO/IECMPEG Audio Committee); G.711, G.722, G.722.1, G.723.1, G.726, G.728, G.729, and from 3GPP, G.722.2 (ITU-T), Enhanced Voice Services (EVS); Monkey's Audio (Matthew T. Ashland); Windows Media Audio (Microsoft); Nellymoser Asao (Nellymoser Inc.); TwinVQ (Nippon Telegraph and Telephone); Siren 7 (PictureTel Corp. (nowPolycomInc.)); SILK and SVOPC (Skype Limited); ATRAC (Sony Corp.); True Audio (TTA) (TAU Software); Shorten (Tony Robinson); and Vorbis/Ogg, CELT, Speex, and FLAC (Xiph.Org Foundation and individuals.

Furthermore, note that while a circular buffer and a packet queue is mentioned in the above embodiments for the jitter buffer data structure, other different data structures are known and may be used to realize the functionality of the jitter buffer data structure.

Unless specifically stated otherwise, as apparent from the following discussions, it is appreciated that throughout the specification discussions utilizing terms such as "processing," "computing," "calculating," "determining" or the like, refer to the action and/or processes of a host device or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, for example, from registers and/or memory to transform that electronic data into other electronic data that, for example, may be stored in registers and/or memory.

The methodologies described herein are, in one embodiment, performable by one or more processors that accept machine-readable instructions, for example, as firmware or as software, that when executed by one or more of the processors carry out at least one of the methods described herein. In such embodiments, any processor capable of executing a set of instructions (sequential or otherwise) that specify actions to be taken may be included. Thus, one example is a programmable digital signal processor (DSP) device. Another is the CPU of a microprocessor or other computer-device, or the processing part of a larger application specific integrated circuit (ASIC). A processing system may include a memory subsystem including main RAM and/or a static RAM, and/or ROM (each of these being an example of a non-transitory computer-readable medium). A bus subsystem may be included for communicating between the components. The processing system further may be a distributed processing system with processors coupled wirelessly or otherwise, for example, by a network. If the processing system requires a display, such a display may be included. The processing system in some configurations may include a sound input device, a sound output device, and a network interface device. The memory subsystem thus includes a machine-readable non-transitory medium that is coded with, or has stored therein, a set of instructions to cause performing, when executed by one or more processors, one of more of the methods described herein. Note that when the method includes several elements, for example, several steps, no ordering of such elements is implied, unless specifically stated. The instructions may reside in the hard disk, or may also reside, completely or at least partially, within the RAM and/or other elements within the processor during execution thereof by the system. Thus, the memory and the processor also constitute the non-transitory machine-readable medium with the instructions.

Furthermore, a non-transitory machine-readable medium may form a software product. For example, it may be that the instructions to carry out some of the methods, and thus form all or some elements of the inventive system or apparatus, may be stored as firmware. A software product may be available that contains the firmware, and that may be used to "flash" the firmware.

Note that while some diagram(s) only show(s) a single processor and a single memory that stores the machine-readable instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a non-transitory machine-readable medium coded with, or having stored therein, a set of instructions for execution on one or more processors, for example, one or more processors that are part of the receiver forming a pen stroke capture system.

Note that, as is understood in the art, a machine with application-specific firmware for carrying out one or more example embodiments becomes a special purpose machine that is modified by the firmware to carry out the example embodiments. This is different from a general purpose processing system using software, as the machine is especially configured to carry out the one or more aspects. Furthermore, as would be known to one skilled in the art, if the number the units to be produced justifies the cost, any set of instructions in combination with elements such as the processor may be readily converted into a special purpose ASIC or custom integrated circuit. Methodologies and software have existed for years that accept the set of instructions and particulars of the processor used in a design, and automatically or mostly automatically great a design of special-purpose hardware, for example, generate instructions to modify a gate array or similar programmable logic, or that generate an integrated circuit to carry out the functionality previously carried out by the set of instructions. While some general skill may be required to so generate the gate array or similar programmable logic, or an integrated circuit, those aspects are standard, and may be contracted to be realized using standard design methodologies once the design described herein is provided. Thus, as will be appreciated by those skilled in the art, example embodiments may be in the form of a method, an apparatus such as a special purpose apparatus, an apparatus such as a DSP device plus firmware, or a non-transitory machine-readable medium. The machine-readable carrier medium carries host device readable code including a set of instructions that when executed on one or more processors cause the processor or processors to implement a method. Accordingly, example embodiments may take the form of a method, an entirely hardware embodiment, an entirely software embodiment or an embodiment combining software and hardware aspects. Furthermore, example embodiments may take the form a computer program product on a non-transitory machine-readable storage medium encoded with machine-executable instructions.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims requires more features than are expressly recited therein. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate example embodiments.

Furthermore, while some embodiments described herein include some but not other features included in other embodiments, combinations of features of different embodiments are meant to be within the scope of the overall apparatus and method, and form different embodiments, as would be understood by those in the art. For example, in the following claims, any of the claimed embodiments can be used in any combination.

Furthermore, some of the embodiments are described herein as a method or combination of elements of a method that can be implemented by a processor of a host device system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the example embodiments.

In the description provided herein, numerous specific details are set forth. However, it is understood that example embodiments may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Any discussion of prior art in this specification should in no way be considered an admission that such prior art is widely known, is publicly known, or forms part of the general knowledge in the field.

In the claims below and the description herein, any one of the terms including, included of or which includes is an open term that means including at least the elements/features that follow, but not excluding others. Thus, the term including, when used in the claims, should not be interpreted as being limitative to the means or elements or steps listed thereafter. For example, the scope of the expression a device including A and B should not be limited to devices consisting only of elements A and B. Any one of the terms including or which includes or that includes as used herein is also an open term that also means including at least the elements/features that follow the term, but not excluding others. Thus, including is synonymous with and means including.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path that includes other devices or mechanisms along the path. "Coupled" may mean that two or more elements are either in direct physical or electrical contact, or that two or more elements are not in direct contact with each other but yet still co-operate or interact with each other.

Thus, while there has been described what are believed to be the example embodiments, those skilled in the art will recognize that other and further modifications may be made thereto, and it is intended to claim all such changes and modifications as fall within the scope of the various embodiments. For example, any formulas given above are merely representative of procedures that may be used. Functionality may be added or deleted from the block diagrams and operations may be interchanged among functional blocks. Steps may be added or deleted to methods described herein.

Note that the claims attached to this description form part of the description, so are incorporated by reference into the description, each claim forming a different set of one or more embodiments.

What is claimed is:

1. An apparatus operative to process packets of media received from a network, including:
    a receiver unit operative to receive the packets from the network; a jitter buffer data structure for arranging the received packets in an ordered queue, the jitter buffer data structure having a tail into which the packets are input and a playback head defining a point in the jitter buffer data structure from which the ordered queue of packets are to be played back, and at least one prototype head, each prototype head having a predetermined latency assigned thereto and defining a point in the jitter buffer data structure from which the ordered queue of packets is being played back containing said predetermined latency;
    a processor operable to determine a measure of conversational quality associated with the ordered queue of packets being played back by each prototype head, wherein said measure of conversational quality is determined at least in part by a measure of predicted listening quality and said predetermined latency; and
    a head selector operable to compare said measures of conversational quality associated with the ordered queue of packets being played back by each prototype head to select the prototype head with a highest measure of conversational quality so as to adjust the playback head to match the prototype head associated with the highest measure of conversational quality; and
    a playback unit coupled to the playback head,
    wherein, the processor comprises a plurality of measurement units and each prototype head is coupled to an associated measurement unit to determine the measure of conversational quality achieved by each prototype head.

2. An apparatus according to claim 1, wherein the measure of conversational quality of each prototype head determined by the measurement unit is a function of both delay and speech impairment for each prototype head.

3. An apparatus according to claim 2, wherein the function of speech impairment is expressed as a corresponding conceal rate or packet loss ratio provided for each prototype head.

4. An apparatus according to claim 2, wherein the processor determines said measures of conversational quality for each prototype head by applying the function of delay and conceal rate of each prototype head to a predetermined model of conversational quality.

5. An apparatus according to claim 4, wherein the predetermined model of conversational quality is a predetermined empirical model generated through performing subjective behavioral testing of human subjects across a variety of different conversational situations and determining how the human subjects simultaneously value the function of delay and conceal rate against conversational quality.

6. An apparatus according to claim 4, wherein the predetermined model of conversational quality is a theoretical model based on a theoretical understanding of an effects of the function of delay and conceal rate against conversational quality.

7. An apparatus according to claim 4, wherein the head selector selects the prototype head having the combination of values of the delay and conceal rate that provides the best conversational quality based on the predetermined model of conversational quality.

8. An apparatus according to claim 7, wherein the head selector adjusts the playback head such that the combination of values of the delay and conceal rate of the prototype head selected as providing the best conversational quality are used to adjust the playback head.

9. A jitter buffering method in an apparatus that comprises a jitter buffer data structure and processing hardware, including:
    receiving packets of media from the network; inputting each packet into a jitter buffer data structure, arranging the received packets in an ordered queue, the jitter buffer data structure having a tail into which the packets are input and a playback head defining a point in the jitter buffer data structure from which the ordered queue of packets are to be played back, and at least one prototype head, each prototype head having a predetermined latency assigned thereto and defining a point in the jitter buffer data structure from which the ordered queue of packets is being played back containing said predetermined latency;
    determining a measure of conversational quality associated with the ordered queue of packets being played back by each prototype head, wherein said measure of conversational quality is determined at least in part by a measure of predicted listening quality and said predetermined latency; and comparing said measures of conversational quality associated with the ordered queue of packets being played back by each prototype head to select the prototype head with a highest measure of conversational quality so as to adjust the playback head to match the prototype head associated with the highest, wherein the measure of conversational quality associated with each prototype head is determined by coupling each prototype head to a measurement unit to determine conversational quality as a function of both the delay and of a conceal rate of each prototype head.

10. A jitter buffer method according to claim 9, wherein the measurement unit applies the function of both the delay and the conceal rate of each prototype head to a predetermined model of conversational quality to determine the measure of conversational quality for each prototype head.

11. A jitter buffer method according to claim 10, wherein the measures of conversational quality for each prototype head are compared to determine the prototype head having the combination of values of the delay and the conceal rate that provides the highest measure of conversational quality based on the predetermined model of conversational quality.

12. A jitter buffer method according to claim 10, wherein the playback head of the jitter buffer data structure is set to match the combination of values of the delay and the conceal rate of the prototype head that provides the highest measure of conversational quality.

13. A non-transitory computer-readable medium with instructions stored thereon that when executed a processor perform causes the processor to execute the following steps:
receive packets of media from the network; inputting each packet into a jitter buffer data structure, arranging the received packets in an ordered queue, the jitter buffer data structure having a tail into which the packets are input and a playback head defining a point in the jitter buffer data structure from which the ordered queue of packets are to be played back, and at least one prototype head, each prototype head having a predetermined latency assigned thereto and defining a point in the jitter buffer data structure from which the ordered queue of packets is being played back containing said predetermined latency;

determine a measure of conversational quality associated with the ordered queue of packets being played back by each prototype head, wherein said measure of conversational quality is determined at least in part by a measure of predicted listening quality and said predetermined latency; and compare said measures of conversational quality associated with the ordered queue of packets being played back by each prototype head to select the prototype head with a highest measure of conversational quality so as to adjust the playback head to match the prototype head associated with the highest, wherein the measure of conversational quality associated with each prototype head is determined by coupling each prototype head to a measurement unit to determine conversational quality as a function of both the delay and of a conceal rate of each prototype head.

\* \* \* \* \*